United States Patent [19]

Richards et al.

[11] 3,931,011

[45] Jan. 6, 1976

[54] FLUID SEPARATION APPARATUS

[75] Inventors: Mark S. Richards; Shannon B. Copeland, both of Modesto, Calif.

[73] Assignee: Racor Industries, Inc., Modesto, Calif.

[22] Filed: Nov. 19, 1973

[21] Appl. No.: 417,225

[52] U.S. Cl. ............... 210/136; 210/304; 210/305; 210/311; 210/313; 210/335; 210/341; 210/456

[51] Int. Cl.² ........................................ B01D 27/08

[58] Field of Search ....... 210/86, 95, 114, 136, 295, 210/304, 305, 311, 313, 335, 341, 436, 438, 456, 472, 512 R, 119

[56] References Cited
UNITED STATES PATENTS

| | | | |
|---|---|---|---|
| 1,378,274 | 5/1921 | Probst | 210/295 X |
| 2,052,540 | 8/1936 | Delano | 210/304 |
| 2,313,896 | 3/1943 | Scheble | 210/512 R |
| 2,729,338 | 1/1956 | Heigl | 210/341 X |
| 2,983,384 | 5/1961 | Winslow | 210/304 X |
| 3,199,676 | 8/1965 | May | 210/114 |
| 3,253,712 | 5/1966 | Posgate | 210/136 |
| 3,397,793 | 8/1968 | MacDonnell | 210/493 X |
| 3,428,180 | 2/1969 | Rogers | 210/311 |
| 3,494,863 | 2/1970 | Greenman | 210/493 X |

FOREIGN PATENTS OR APPLICATIONS

| | | | |
|---|---|---|---|
| 566,803 | 12/1958 | Canada | 210/304 |
| 229,236 | 8/1963 | Austria | 210/304 |

*Primary Examiner*—Frank A. Spear, Jr.
*Assistant Examiner*—Robert G. Mukai
*Attorney, Agent, or Firm*—Phillips, Moore, Weissenberger Lempio & Strabala

[57] ABSTRACT

An improved self-contained apparatus for the separation of low density fluids from higher density insoluable fluids or particles or both in which initial separation, coalescing and filtration steps are carried out substantially in series and in that order, is disclosed. Specific embodiments of such apparatus for use in oil-water separation are described and specific structures and devices for use in such apparatus are disclosed.

5 Claims, 11 Drawing Figures

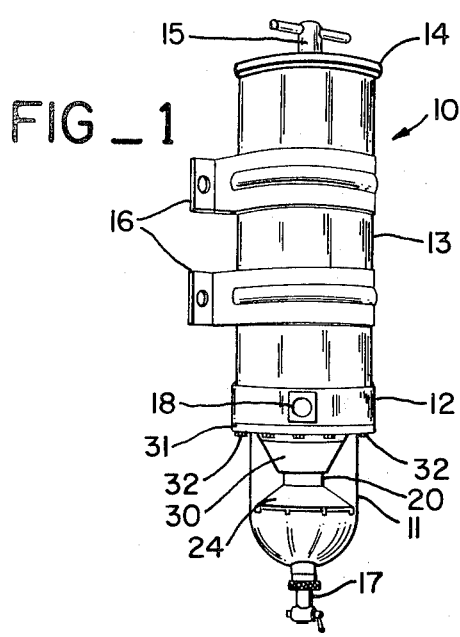
FIG_1
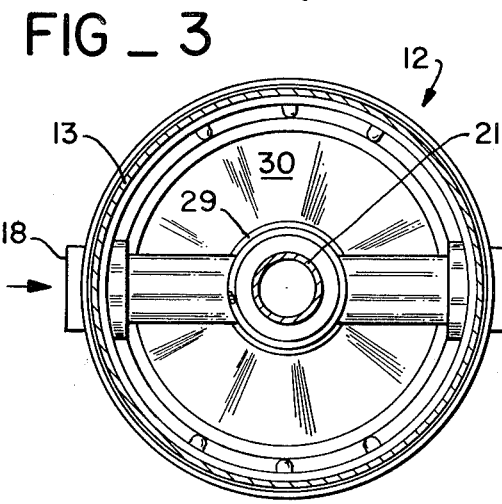
FIG_3
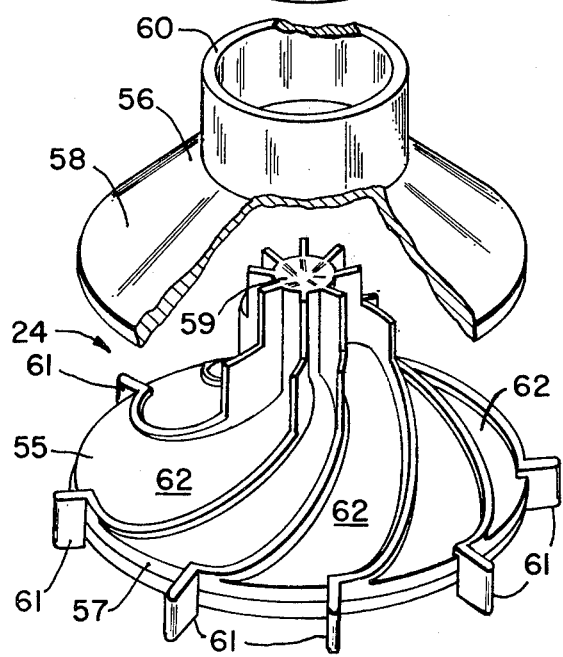
FIG_4
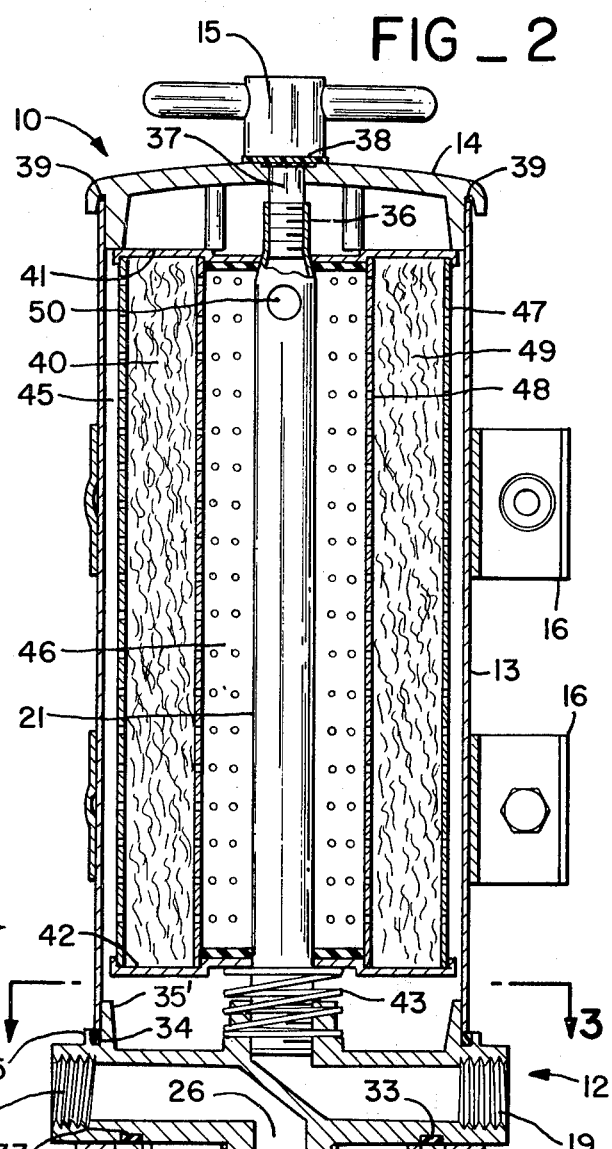
FIG_2

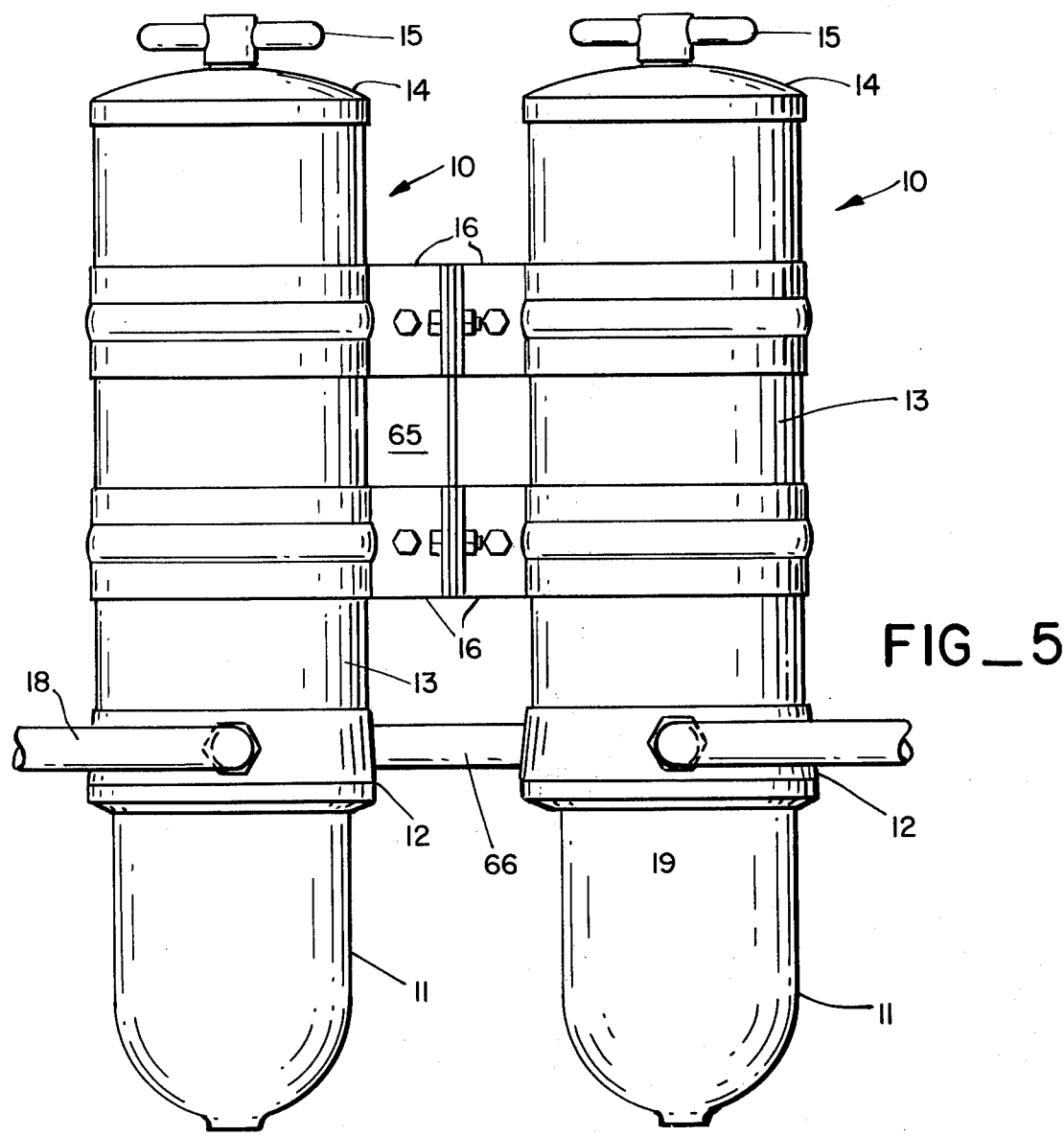
FIG_5
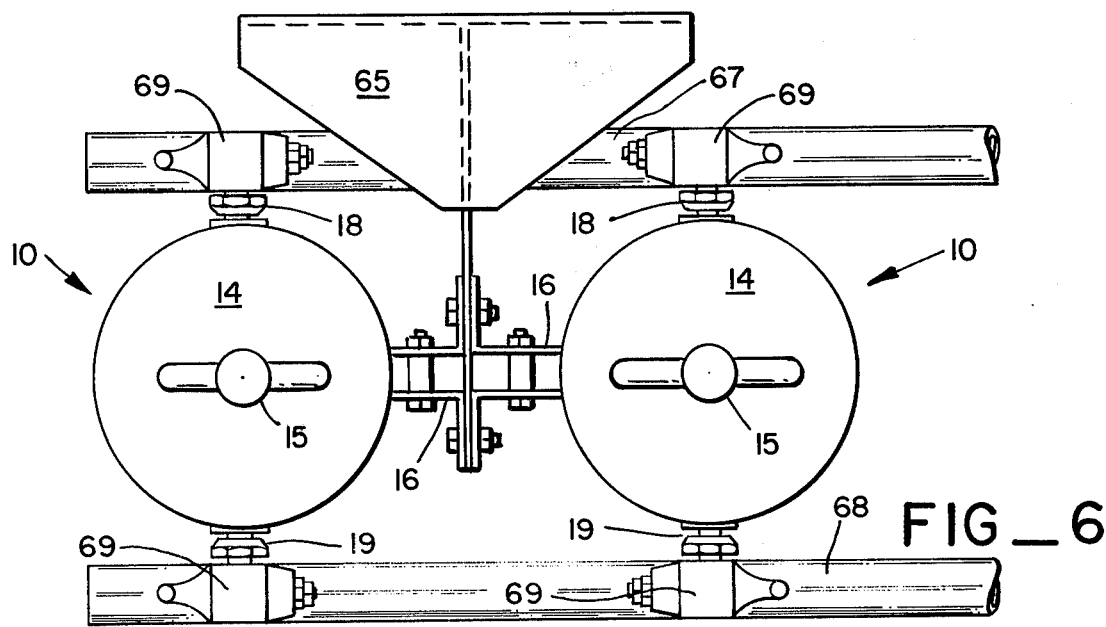
FIG_6

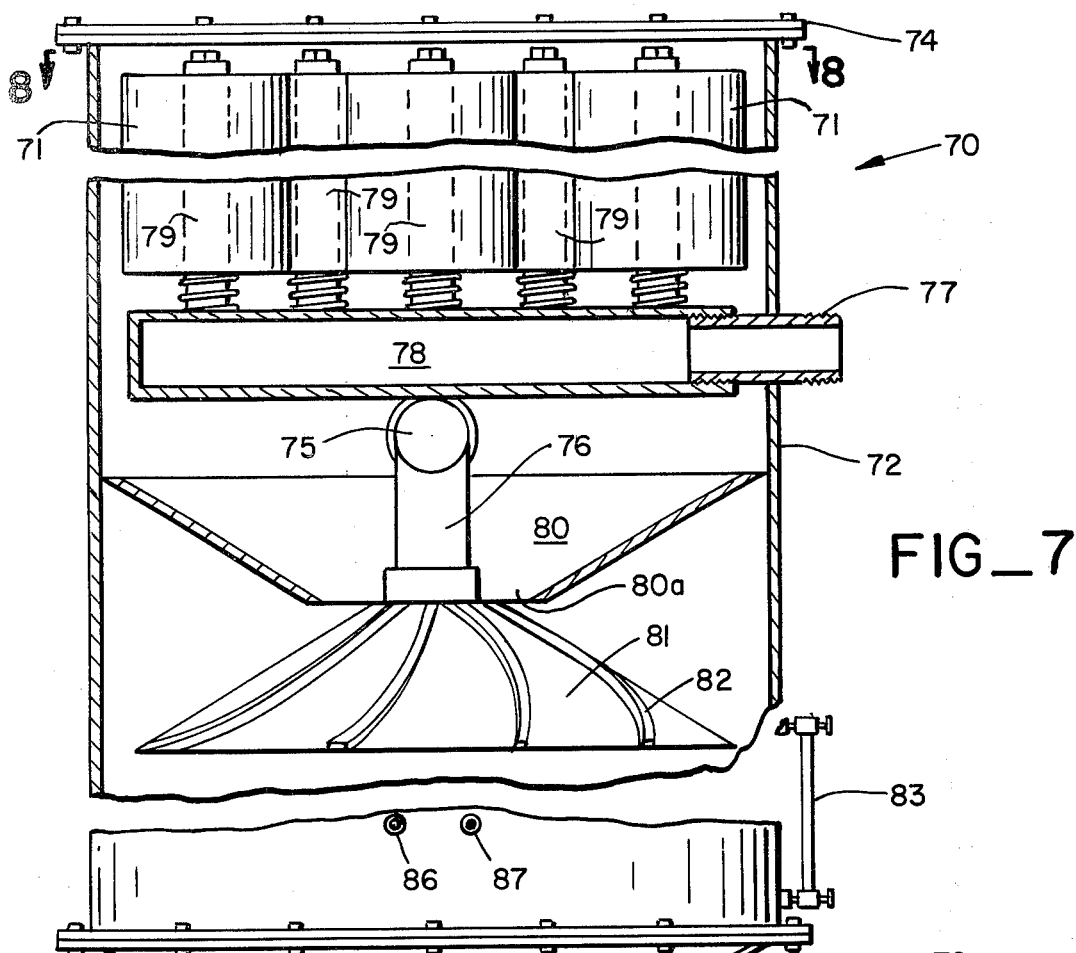
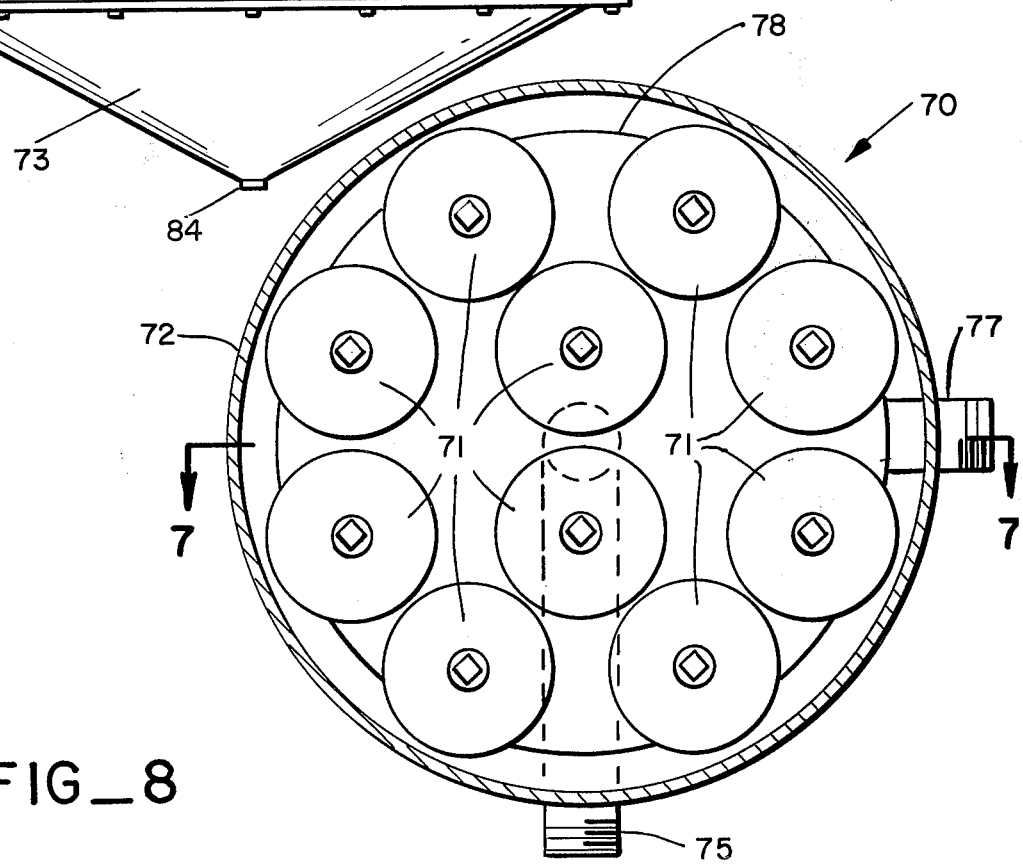
FIG_7
FIG_8

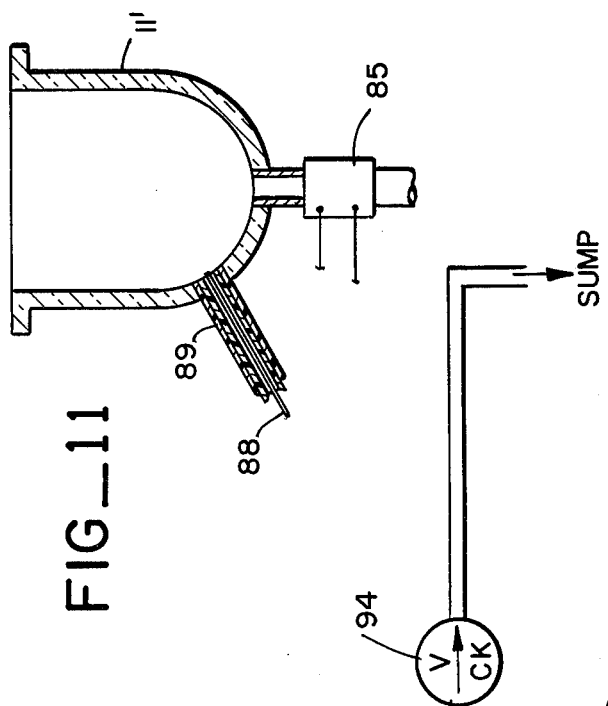
FIG_11
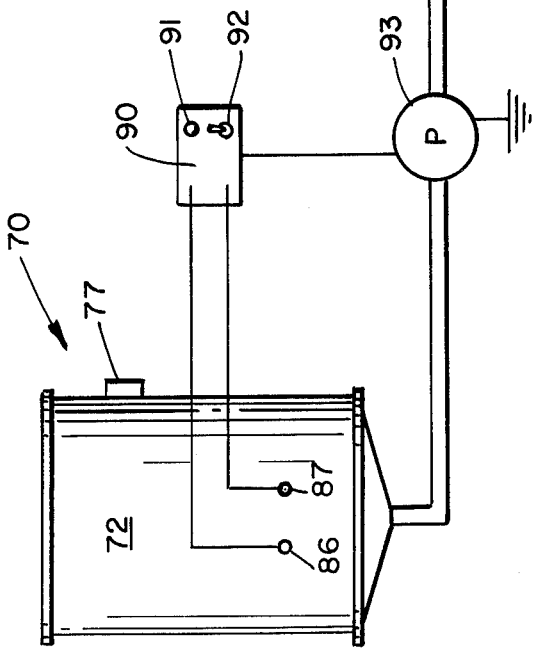
FIG_9
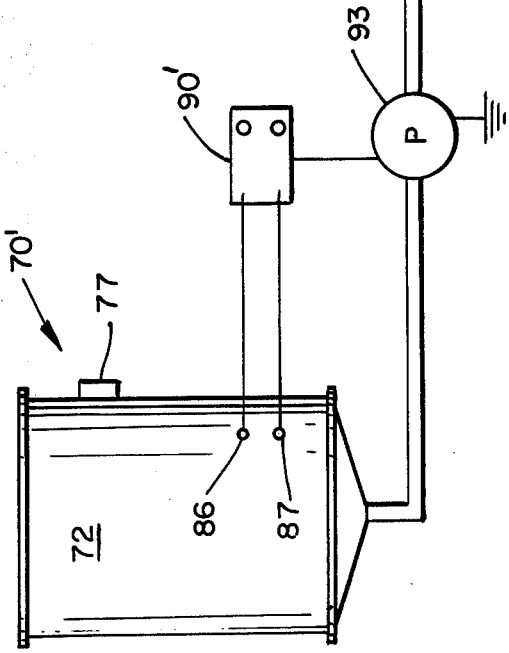
FIG_10

FLUID SEPARATION APPARATUS

BACKGROUND OF THE INVENTION

This invention relates to apparatus for the separation of low density fluids from higher density fluids or particles or both and more particularly to self-contained apparatus in which initial separation, coalescing and filtration steps are carried out substantially in series and in that order.

Self-contained devices for the separation of solid particulate matter and high density fluids such as water from lower density fluids such as oil, kerosene, diesel fuel, gasoline and even air, have been devised heretofore in which separation, coalescing, and filtration action have occurred. However, in such prior art devices, such actions have been carried out more or less simultaneously and often without adequate provision for one or more of such actions. In particular, the initial separation of fluids has not been adequately provided for or accomplished in the prior art.

It will be understood that "initial separation" action comprises the removal of large particles and droplets of high density fluids that may be entrained in the flow of the mixture of fluids and which, if not separated out, tend to be collected on the leading surface of the filter means, due to their size, requiring frequent replacement or cleaning of the filter means. "Coalescing" action is the formation of large droplets of high density fluid due to the capture of smaller droplets by larger droplets. Such action is a function of the surface tension of the high density fluid and is sometimes referred to as "beading" action. Finally, "filtration" action is the straining of the lower density fluid to physically remove higher density fluids and particles by means of a filter element.

In general, prior art devices of interest have comprised a hollow chamber providing a sediment bowl at the bottom and containing a replaceable filter element at the top. The fluid is introduced into the bottom of the chamber and allowed to percolate upwardly and through the filter element to an outlet at the top of the chamber.

U.S. Pats. No. 2,543,481 to Wicks et al. and No. 2,486,389 to Clark are representative of such prior art devices. In the operation of such devices the higher density fluids and particles are expected to gravitate into the bottom of the sediment bowl where they may be drained from the system.

However, in actual practice, the constant flow of fluid into the bottom of such prior art devices tends to re-entrain a substantial portion of the fluids and particles which settle into the sediment bowl before they can be drained, carrying them to the leading surface of the filter element where they are collected, thus tending to clog the filter and require its early replacement. It will be understood that, in such prior art devices, there is essentially no initial separation action other than in conjunction with whatever coalescing action may occur at the leading surface of the filter element or elsewhere in the device.

In U.S. Pat. No. 3,187,893 to Poll et al., a device is disclosed in which an attempt is made to provide coalescing action in a portion of the device physically distinct from the filtration element. However, no provision whatever is made for initial separation prior to the coalescing element thereof which element is a coarse filter that is subject to clogging by large particles entrained in the incoming fluids.

The device disclosed in U.S. Pat. No. 3,428,180 to Rogers represents an entirely different approach to the problem and is a great improvement over the prior art. However, it has been found that even greater improvement over the prior art may be obtained by providing an initial separation action and by physically dividing the initial separation, coalescing and filtration action from each other so that these actions occur in series and in that order in accordance with the teaching of this invention.

Thus, it is an object of this invention to provide improved apparatus for the separation of low density fluids from higher density fluids or particles or both.

It is a further object of this invention to provide such apparatus in a self-contained and compact form which is convenient to install and maintain, simple and inexpensive to manufacture and yet more efficient in operation without frequent servicing.

SUMMARY OF THE INVENTION

Briefly, the self-contained apparatus for separating low density fluids from higher density fluids and particles according to the teaching of this invention comprises a hollow elongated chamber closed at one end by a cup means. A fluid inlet extends into the chamber intermediate its ends and includes a tubular portion extending toward the cup means along the axis of elongation of the chamber. A fluid impervious funnel member surrounds the tubular portion of the inlet passage in close spaced relation to its outer surface with apex of the funnel member extending toward the cup means and the outer periphery of the funnel member extending into fluid-tight relation with the inner surface of the chamber. A deflector turbine means is mounted at the free end of the tubular portion of the inlet passage to receive fluid therefrom and urge it to move in generally annular paths about the axis of elongation of the chamber and extends across the chamber with portions thereof in contact with and other portions in close spaced relation to the inner surface of the chamber. An outlet passage extends out of the chamber intermediate its end and has a tubular portion extending away from the cup means along the axis of elongation of the chamber and a tubular filter element surrounds such tubular portion of the outlet passage in spaced relation thereto and with the outer surface of the filter element spaced from the inner surface of the chamber. A fluid impervious wall means closes the inner end of the filter element extending into close spaced relation with the inner surface of the chamber and a cap member, in cooperation with means forming a closure across the outer end of the filter element, closes the end of the chamber opposite from the cup means.

BRIEF DESCRIPTION OF THE DRAWING

The foregoing and other objects and features of the apparatus of this invention will be more fully understood from the following detailed description of preferred embodiments thereof when read in conjunction with the drawing wherein:

FIG. 1 is a side view in elevation of a device according to one embodiment of this invention.

FIG. 2 is an enlarged cross-sectional view of the embodiment of this invention shown in FIG. 1.

FIG. 3 is a cross-sectional view taken along lines 3—3 of FIG. 2.

FIG. 4 is an exploded perspective view of the deflector turbine element of the embodiment of this invention shown in FIGS. 1 and 2.

FIG. 5 is an enlarged side view in elevation of a pair of devices as shown in FIG. 1 mounted in tandem and interconnected in series with each other.

FIG. 6 is a top view of the devices mounted in tandem as in FIG. 5 but interconnected in parallel with each other.

FIG. 7 is a cross-sectional view of a device according to a further embodiment of this invention taken along lines 7—7 of FIG. 8.

FIG. 8 is a cross-sectional view of such further embodiment of the invention taken along lines 8—8 of FIG. 7.

FIG. 9 is a block diagram of a manually controlled electrical system for draining high density fluids and particulate matter from a device according to this invention.

FIG. 10 is a block diagram similar to FIG. 9 showing an automatically controlled electrical system for draining high density fluids and particulate matter from a device according to this invention.

FIG. 11 is a cross-sectional view of a cup means which may be used in embodiments of this invention as shown in FIGS. 1 and 2 to enable such device to be used with the electrical systems of FIGS. 9 and 10.

DESCRIPTION OF PREFERRED EMBODIMENTS

Referring to FIG. 1, a device 10 according to a preferred embodiment of the apparatus of this invention is shown in side elevation. The device 10 comprises four major structural elements forming an elongated hollow chamber closed at both ends. Thus a cup means 11 is mounted on the underside of an annular body 12 in fluid-tight relation thereto and an elongated hollow filter chamber 13 is mounted on the upper side of the annular body 12 in fluid-tight relation thereto with the free end of the elongated filter chamber 13 being closed fluid-tight by a cap member 14.

The cap member 14 is removably mounted on the free end of the filter chamber 13 in fluid-tight relation thereto by means of a "T" handle fastener 15, the structure and purpose of which will be more fully described hereinafter. One or more mounting brackets 16 may be provided about the filter chamber 13 for convenient mounting of the device 10 in operation.

As shown in FIG. 1, the cup means 11 comprises a conventional sediment bowl made of transparent material although it could also be made of metal. The cup means is mounted on the underside of the annular body 12 in fluid-tight relation by means which will be more fully described hereinafter and a drain valve 17 is provided at the bottom of the cup means 11 to enable sediment in the form of high density fluid and particles to be drained from the apparatus 10.

The cup means 11, annular body 12, filter chamber 13, cap 14 and all other internal parts of the device 10 are made of non-corrosive materials which are resistant to the fluids to be separated therein which materials are preferably low cost and light in weight. A fluid inlet means 18 and a fluid outlet means 19 (not shown in FIG. 1) are provided in the annular body 12.

Referring to FIG. 2, it will be seen that the inlet means 18 comprises a passageway in annular body 12 terminating in a tubular portion 20 which extends toward the cup means 11 coaxially of the device 10. Similarly, it will be seen from FIG. 2 that the outlet means 19 comprises a passageway through the annular body 12 terminating in a tubular portion 21 extending toward the cap 14 coaxially of the device 10. Although the inner surfaces of the cup means 11, annular body 12 and filter chamber 13 define sections of right circular cylinders, it will be understood that such shape is not an essential feature of this invention although circular configuration of the cup means 11, tubular portion 20 of the inlet means 18 and other elements associated therewith is highly desirable for reasons which will be more fully discussed hereinafter. Similarly, the coaxial arrangement of the inlet means 18 and outlet means 19 is not an essential feature of this invention although it is preferred for the tubular portion 21 of the outlet means 19 of the device 10 and highly beneficial for the tubular portion 20 of the inlet means 18 in any embodiment of the apparatus of this invention.

According to the teachings of this invention, a deflector turbine means designated generally by the reference numeral 24 in FIGS. 2 and 4 is mounted at the free end of the tubular portion 20 of the inlet means 18. As shown in FIG. 2 the deflector turbine means extends all the way across the cup means 11 thereby dividing it into upper and lower sections, the deflector turbine means having portions of its outer periphery in contact with the inner surface of the cup means 11 and other portions in close spaced relation to the inner surface of the cup means 11 to thereby provide communication between the upper and lower sections of such cup means 11.

According to this embodiment of the invention, the deflector turbine means 24 is made in two parts as shown in FIG. 4 and is mounted directly on the end of the tubular portion 20 of the inlet means 18, as will be more fully described hereinafter. However, it will be understood that the deflector turbine means 24 could comprise a single wall mounted on the cup means 11 adjacent the free end of the tubular portion 20 of the inlet means 18, provided that its upper surface is properly configured to provide the desired centrifuge action which will be more fully described hereinafter.

According to this embodiment of the invention, a float valve is included in the device 10 to prevent the fluids contained therewithin from draining out of the device 10 and back into the source of such fluid if the system in which the device 10 is being used should be shut down for any reason. Such float valve comprises a hollow ball 25, preferably made of aluminum and received within the tubular portion 20 of the inlet means 18. As shown in FIG. 2, the inlet means 18 is provided with a restriction 26 within the tubular portion 20 thereof, and above the ball 25. Such restriction is preferably provided with a resilient gasket 27 adapted to engage the outer surface of the ball 25 and form a fluid-tight seal therewith.

Thus, if the flow of fluid into the inlet means 18 is interrupted, the hollow ball 25 will float upwardly into contact with the resilient gasket 27, closing the restriction 26 in the inlet means 18. The weight of the fluid contained in the upper portion of the device 10, including the filter chamber 13, will tend to force the ball 25 into intimate contact with the gasket 27 thereby preventing the flow of fluid in the reverse direction and out of inlet means 18 toward the source of fluid.

A funnel member 30 surrounds the tubular portion 20 of the inlet means 18 in close spaced relation thereto forming an annular space 29. The outer periphery of the funnel member is joined to the cup means 11 in a fluid-tight manner with the apex of the funnel member 30 extending into the cup means 11. In the embodiment of this invention shown in FIG. 2, both the cup member 11 and the outer periphery of funnel member 30 are mounted on the underside of the annular member 12 by means of a collar 31 adapted to be secured to the annular member 12 by a plurality of screws 32 which bring the collar 31 into compressive contact with shoulders on the cup member 11 and funnel member 30 forcing them into fluid-tight relation with a gasket 33 received in a groove in the annular member 12.

As shown in FIG. 2, the filter chamber 13 comprises a hollow cylinder, one end of which is received together with a gasket 34 in a groove in the upper surface of the annular member 12 provided by a pair of upstanding flanges 35 and 35'. The tubular portion 21 of the outlet means 19 extends coaxially of the filter chamber 13 substantially the full length thereof and terminates in a threaded restriction 36 adapted to receive the end of a threaded stud 37 which forms a part of T handle fastener 15.

The stud 37 passes through an aperture in the cap 14 which is provided with an appropriate gasket 38 adapted to be compressed into fluid-tight relation with the stud 37 and cap 14 when the threads of the stud 37 are fully engaged with the threaded restriction 36. The gasket 38 may be of nylon, for example, to facilitate the removal of the cap 14 by rotating the T handle to disengage the threads of the stud 37 from the threaded restriction 36. It will be seen that the outer periphery of the cap 14 is provided with a groove 39 adapted to receive the free end of the filter chamber 13 together with an appropriate gasket to insure a fluid-tight seal between the free end of the filter chamber 13 and the cap 14.

A hollow cylindrical filter element 40 surrounds the tubular portion 21 of the inlet means 19 and apertured upper 41 and lower 42 walls are provided at opposite ends of the filter element 40. The apertures in the walls 41 and 42 are dimensioned to receive the tubular portion 21 of the outlet means 19 and are provided with appropriate gaskets to insure a fluid-tight seal between the outer surface of the tubular portion 21 and the walls 41 and 42.

The upper wall 41 is engaged by the cap 14 and the lower wall 42 is engaged by a spring means 43 interposed between such lower wall 42 and the annular body 12. Thus, the spring means 43 assists in the removal of the filter element 40 from the filter chamber 13 upon removal of the cap 14 by disengaging the threads of the stud 37 from the threaded restriction 36.

Since the walls 41 and 42 are made of fluid impervious material and since the outer surface of the cylindrical filter element 40 is spaced from the inner surface of the filter chamber 13 and the inner surface of the cylindrical filter element 40 is spaced from the outer surface of the tubular portion 21 of the outlet means 19, it willl be seen that a pair of spaced annular volumes 45 and 46 are formed with the cylindrical filter element 40 providing the only fluid communication therebetween. The filter element 40 preferably comprises a foraminous outer cylindrical wall 47 and a foraminous inner cylindrical wall 48 forming an annular volume 49 therebetween which is filled with a radial flow surface type filter material preferably of resin impregnated cellulose. Thus, it will be seen that in flowing from the outer volume 45 to the inner volume 46 of the device 10, the fluid must pass radially through the foraminous walls 47 and 48 and through the filter material contained in the volume 49 between such foraminous walls.

A pair of aligned outlet ports 50 are provided at the upper end of the tubular portion 21 of the outlet means 19. Thus, fluid which passes through the filter element 40 and into the volume 46 will flow out of such volume 46 through the outlet ports 50 and outlet means 19.

It will be understood that in the usual application for a device such as the embodiment 10 of the apparatus of this invention, a pump is attached to the outlet means 19 of the device 10 which pump delivers the fluid which passes through the device 10 to an appropriate utilization device such as a diesel engine, for example. Thus the inlet means 18 of the device 10 is connected to an appropriate reservoir of a fluid such as diesel oil, for example, the function of the device 10 in this application being to remove undesirable high density fluids such as water and any particulate matter that may be entrained in the diesel fuel before the diesel fuel reaches the pump attached to the outlet means 19. It will be understood that it is virtually impossible to control the condition of diesel fuel from the time it leaves the refinery until it reaches the reservoir from which it is drawn for utilization in a diesel engine, for example. Even in the reservoir it is subject to further contamination due to the condensation of water therein or the introduction of carbon, rust or other contaminants into the reservoir. In addition, aeration of the fuel in the reservoir is inescapable. Thus, when diesel fuel, for example, is drawn from a reservoir thereof, water, particulate matter and air will all be entrained in the fuel and if the water and particulate matter are not removed, they will tend to cause damage to the pump and to the engine to which the fuel is supplied. The entrainment of air in the fuel produces a particular problem in connection with the filtration of the fluid to remove the water and particulate matter therefrom which will be more fully discussed hereinafter.

It will be understood that the flow of fluids through embodiments of this invention such as the device 10 comprises a complex system of currents of various velocities often flowing in opposite directions within the volume of the fluid due to the fact that the volume of the device 10 is large in comparison to the cross sectional area of the inlet 18 and outlet 19 means and it may be helpful in visualizing the operation of the device 10 to keep in mind the phenomena of eddy currents in flowing fluids. Thus, the introduction of a flowing fluid into the inlet means 18 and through the restriction 26 thereof will force the hollow ball 25 downwardly within the tubular portion 20 and against the upstream end of the deflector turbine means 24 as shown in FIG. 2.

Referring to FIG. 4, the deflector turbine means 24 of this embiment 10 of the apparatus of this invention comprises a deflector member 55 and a shield member 56 made of light weight, low cost, non-corrosive material which is impervious to the fluid involved such as plastic, for example. The deflector member 55 and the shield member 56 comprise mating frusto-conical bodies 57 and 58. However, the deflector member 55 is provided with a fluted stem 59 extending from the apex thereof and the shield member 58 is provided with a tubular extension 60 surrounding an aperture at its apex adapted to receive the fluted stem 59 with a tight fit. The tubular extension 60 of the shield member 58 is in turn dimensioned to be received within the end of the tubular portion 20 of the inlet means 18 with a tight fit.

Both the deflector member 55 and the shield member 58 are dimensioned such that the bodies 57 and 58 thereof extend to outer peripheries in close spaced relation to the inner surface of the cup means 11. However, the outer periphery of the body 57 of the deflector member 55 is provided with a plurality of protuberances 61 which extend into contact with the inner surface of the cup means 11. In addition, the upper surface of the body 57 of the deflector member 55 is provided with extensions 62 of the flutes on the stem 59 which extend helically across the upper surface of the body 57, each of such flutes 62 terminating between different pairs of the protuberances 61 about the outer periphery of the body 57.

As shown in FIG. 4, the flutes on the stem 59 are notched at their upper extremity to provide passageways 63 for the fluid when the ball 25 is received on the upper end of the stem 59 (see FIG. 2).

Thus, the fluid introduced into the inlet means 18 passes through the restriction 26, tubular member 20 and around the ball 25 into the passageways 63 which admit the fluid to the helical flutes 62. As best shown in FIG. 4, the channel size of the flutes 62 increases in its dimensions as it approaches the outer periphery of the body 57 of the deflector member 55, thus tending to impart increased velocity to the flow of the fluid in the channels through a venturi action. Due to the shape of the channels the fluid will be urged to flow in annular pathways about the axis of the device 10, thereby producing a centrifuge action in the upper section of the cup means 11 bounded by the lower and upper surfaces of the funnel member 30 and shield member 58, respectively, with such centrifuge action being most pronounced at the outer periphery of the deflector member 55.

The result of such centrifuge action will be that the higher density fluids and particles entrained in the fluid introduced into the inlet means 18 will tend to be concentrated at the inner surface of the cup means 11 within the volume bounded by the funnel member 30 and shield member 56 due to inertial forces. However, the contact between such higher density fluids and particles with the inner surfaces of the cup means 11 and with the protrusions 61 at the outer periphery of the member 55 will counteract the inertia of such higher density fluid and particles tending to selectively cause them to fall by the force of gravity between the protrusions 61 into the lower section of the cup means 11.

The lower density fluids will tend to flow through the annular space 29 between the apertured apex of the funnel member 30 and the outer surface of the tubular portion 20 of the inlet means 18 and upwardly through the annular body 12 into the filter chamber 13. It will be understood that once the higher density fluids and particles have entered the lower portion of the cup means 11 past the deflector member 55, they will be essentially trapped in such lower section of the cup member 11. Furthermore, there will be little if any current in the fluids below the deflector member 55. Thus, the heavier fluids and particles contained in the lower section of the cup member 11 will not tend to be re-entrained in the lower density fluid. Similarly, the velocity of the current flow of the fluid above the funnel member will be very low.

However, it will be understood that very fine droplets of high density fluid and fine particles entrained in the low density fluid will be relatively insensitive to the centrifuge action which occurs in the upper section of the cup means 11 bounded by the shield member 56 and funnel member 30 thus such fine droplets of high density fluid and fine particles will tend to be carried into the volume defined by the annular body 12 and filter chamber 13 which is bounded at its ends by the funnel member 30 and the wall 42 at the bottom of the filter element 40. However, in this area, the gentle flow of the fluid, particularly against the lower surface of the wall 42 but also against the inner surface of the annular body 12 and the outer surface of the inlet 18 and outlet 19 means thereof, will provide an opportunity for the fine droplets of high density material to coalesce with each other. The presence of fine particulate matter will encourage such coalescing action by providing nuclei about which such coalescing action may take place in a manner similar to formation of raindrops about dust particles. In any event, large droplets of high density fluids, usually containing one or more particles, will tend to form in the fluid and particularly on the surfaces of the volume above the funnel member and below the wall 42. When such droplets attain a sufficient size their weight will cause them to move downwardly against the gentle flow of fluid in such volume and into the funnel member 30. As such large droplets move downwardly and through the annular space 29 at the apex of the funnel member 30 against the gentle upward flow of fluid, they will tend to collect fine droplets entrained in such upward flow by coalescing action. The mere size of the large droplets thus formed and their location will cause them to be relatively insensitive to the centrifuge action as they pass through the volume in the upper section of the cup means 11 defined by the shield member 56 and funnel member 30. Thus, such larger droplets will tend to move along the upper surface of the shield member 56 and past the outer periphery of the deflector member 55 into the lower section of the cup means 11.

Thus, it will be seen that most of the higher density fluids and particles will have been removed from the flow of fluid before it reaches the outer periphery of the filter element 40 in the filter chamber 13, leaving only the extremely fine droplets and extremely fine particles to be removed by the filter element 40. Thus, the useful life of the filter element 40 will be increased and its effectiveness insured.

After passing through the filter element 40 the fluid will enter the inner volume 46 defined about the tubular portion 21 of the outlet means 19 by the inner foraminous wall 48 of the filter element 40. As mentioned hereinabove, the inescapable aeration of the fluid will produce a particular problem at this point in the operation of the filter since any air entrained in the fluid will not be removed by the centrifuge action, or the coalescing action, or even the filter element 40, as discussed hereinabove. In fact, the air will pass through the filter element 40 even more easily than the fluid which it is designed to pass and will tend to collect at the upper end of the volume 46. Thus, it is an important feature of this invention that the tubular portion 21 of the outlet means extend substantially the full length of the filter element 40 and that it have a pair of outlet holes 50 adjacent the upper end thereof. Each of such outlet holes 50 must have an area greater than one-half the cross sectional area of the inlet 18 and outlet 19 means. The outlet holes 50 should be directly opposite each other in the walls of the upper end of the tubular portion 21.

It will be understood that if the air which tends to accumulate within the volume 46 is not removed, it will tend to reduce the effective length of the filter element 40 through which fluid may flow in a radial path. It will also be understood that if a pocket of air is allowed to collect in the upper end of the device, there is always the danger that it will be sucked into the outlet means in place of fuel under conditions of maximum demand for fuel flow. The delivery of a pocket of air to a diesel engine, for example, under conditions of maximum demand may well result in damage to the engine and will certainly result in inadequate operation.

In the prior art this problem has either been ignored or has been avoided by locating the outlet at the furthest possible point from the volume in which an air pocket might be formed. Where the flow of fluid through the filter element is longitudinal rather than radial, such a solution to the problem may be adequate. However, where the flow of fluid through the filter element 40 is radial, as in the device embodying the subject invention, the problem cannot be simply ignored without sacrificing filter element efficiency.

It has been found that by locating a pair of opposite holes having a total area greater than the total area of the fuel line at the very peak of the device where the air pocket tends to form maximum efficiency of the device may be assured without the danger of an air pocket being drawn into the fuel line. It will be seen that if a sufficient air pocket is formed to effect the efficiency of the filter unit 40, it will also tend to lower the level of the fluid in the volume 46 below the upper boundary of the holes 50. As soon as this happens, air will be injected back into the fuel from whence it came in minute distributed quantities incapable of affecting the operation of the system. Since the total area of the holes 50 is greater than the cross sectional area of the fuel line and since the air pocket in the top of the device 10 is being constantly depleted by the injection action described above, it is impossible for an air pocket to be drawn into the air line even under conditions of maximum demand.

Thus, it will be seen that the device 10 embodying this invention is designed to approach maximum quality of separation while simultaneously approaching maximum fluid flow through the device. In addition, the device has been designed for ease of maintenance and operation. Thus, the drain valve 17 may be opened to drain high density fluids and particles from the system while it is in operation. It is, of course, necessary to shut down the system in order to replace the filter element 40 periodically since its efficiency will by nature decrease in use as it becomes clogged with fine particles and droplets. The device 10 is designed to enable replacement of the filter element 40 quickly and with little effort. Furthermore, the float valve action provided by the ball 25 will prevent the fluid in the device 10 from draining back into the reservoir through the inlet means 18 when the system is shut down thus maintaining a constantly primed system which will be ready for operation immediately after the replacement of a filter element 40.

According to a further embodiment of the apparatus of this invention, advantageous operation may be obtained by utilizing a pair of devices 10 as described above, in cooperation with each other. Thus, as shown in FIG. 5, the brackets 16 on one of the devices 10 may be reversed in orientation about the filter chamber 13 thereby providing a convenient means for mounting both devices on a common support bracket 65 (best shown in FIG. 6). According to the embodiment shown in FIG. 5, the devices 10 are connected in series by means of coupling pipe 66 interconnecting the outlet means of the left hand device 10 with the inlet means of the right hand device 10. Thus the fluid is subjected to successive filtering action, passing first into the inlet means 18 of the left hand device 10 and then through the pipe 66 into the inlet of the right hand device 10 and to the utilization device from the outlet means 19 of the right hand device 10. The advantage of this embodiment of the apparatus of this invention is that the filter element 40 of the left hand device 10 may be different from the filter element 40 of the right hand device 10. For example, the filter element 40 of the left hand device 10 may be a coarse filter while that of the right hand device 10 may be much finer. Such arrangement would be useful in dealing with heavily contaminated fluids in that it would extend the useful life of both filter elements providing a longer time between shut down periods for the purpose of changing such filter elements.

Referring to FIG. 6, a further embodiment of the apparatus of this invention is shown which is adapted for use in applications where there is at least a periodic demand for a very high volume of filter fluid flow. As shown in FIG. 6, a pair of devices 10 are mounted on a common mounting bracket 65 as described in connection with FIG. 5. However, the devices 10 are connected in parallel by means of inlet pipe 67 which is connected to the inlet means 18 of both devices and outlet pipe 68 which is interconnected with the outlet means 19 of both devices. A first pair of shut off valves 69, each connected between the inlet means 18 of a different one of the devices 10 and the pipe 67 and a second pair of shut off valves 69, each connected between the outlet means 19 of a different one of the devices 10 and the pipe 68, are provided to enable the fluid flow through each of the devices 10 to be shut off independently of the flow through the other device 10. This arrangement makes it possible to change the filter element 40 of one of the devices 10 without interrupting the operation of the other device 10. It will be understood that the embodiment shown in FIG. 6 will provide a volume of fluid flow which is substantially twice the volume of fluid flow possible through a single one of such devices 10.

However, it has been found that the initial separation action and the coalescing action provided in embodiments of the apparatus according to the teaching of this invention tends to be capable of handling a far greater volume of fluid flow than is a filter element 40 of equivalent size. It will be understood that the surface area of the filter element 40 must be increased in order to increase the volume of fluid flow which it can handle. Such surface area may be increased either by increasing the length of the filter element 40 or by increasing its diameter or both. In any case, a filter element capable of effectively filtering a volume of fluid flow equal to the volume of fluid flow which can be effectively handled by an initial separation and coalescing structure of given dimensions according to the teaching of this invention, would have to have dimensions so large as to be out of all practical proportion to such given dimensions.

Thus, referring to FIGS. 7 and 8, a device 70 according to a still further embodiment of this invention is shown in which a plurality of filter elements 71 are utilized. It will be understood that the total surface area of a plurality of cylindrical filter elements of small diameter having equal lengths and being closely spaced from each other will be greater than the surface area of a cylinder of the same length having a diameter large enough to circumscribe the array of small cylinders. For this reason, the volume of fluid flow which can be handled by an array of filters 71 as shown in FIGS. 7 and 8 is much greater than the volume of fluid flow which could be handled by a single cylinder of the same length but having a diameter substantially equal to the total diameter of the array of small cylinders 71.

The device shown in FIGS. 7 and 8 comprises a large cylindrical tank 72 closed at its lower end by a cup-like member 73 and at its upper end by a top plate 74. An inlet means 75 extends through the side wall of the tank intermediate its ends and includes a tubular portion 76 extending downwardly toward the cup member 73. An outlet means 77 extends through the side wall of the tank 72 intermediate its ends and above the inlet means 75 and includes a hollow, circular, disc-like manifold member 78. A plurality of tubular members 79 extend upwardly from the manifold member 78 toward the top plate 74, each of such tubular members 79 communicating with the hollow interior of the manifold 78 and being provided at its upper end with a pair of outlet holes in accordance with the teaching of this invention. Each of the plurality of filter elements 71 surrounds a different one of the plurality of tubular members 79 and each of the filter elements 71 is provided with upper and lower fluid impervious walls in accordance with the teaching of this invention.

A frusto-conical funnel means 80 surrounds the tubular portion 76 of the inlet means 75 with its apertured apex 80a extending toward the cup member 73 and with its outer periphery mounted on the inner wall of the tank 72 in fluid-tight relation thereto. A deflector turbine member 81 having helical flutes 82 formed on the upper surface thereof and being otherwise similar in construction to the deflector turbine member 55 of FIGS. 1 through 4, is mounted in the free end of the tubular portion 76 of the inlet means 75 and extends into close spaced relation with the inner surface of the tank 72. However, in this embodiment of the invention the protuberances on the outer periphery of the deflector turbine 81 have been omitted. Similarly, there is no member corresponding to the shield member 56 of the embodiment shown in FIGS. 1 through 4. However, in all other respects the operation of the embodiment shown in FIGS. 7 and 8 with regard to the centrifuge action is the same as has been described hereinabove in connection with FIGS. 1 through 4 except that the large droplets resulting from the coalescing action in the upper portion of the tank 72 are returned into the funnel 80 and from thence enter into the initial separation process by virtue of their deposition onto the upper surface of the deflector turbine member 81 from the aperture 80a in the apex of the funnel member 80.

According to this embodiment of the apparatus according to this invention, a sight glass 83 structure is provided at the bottom of the tank 72 immediately above the cup member 73 for providing an external indication of the level reached by the high density liquids in the lower part of the tank 72 below the deflector turbine 81. It will be noted that an outlet opening 84 is provided in the lowermost extremity of the cup member 73 through which such high density liquids and particulate matter may be drained. It will also be noted that there is no valve means indicated in FIG. 7 corresponding to the drain valve 17 of FIGS. 1 and 2. Similarly, the drain valve has been omitted in FIG. 5. It will be understood that an appropriate means will be provided in both embodiments to enable the selective draining of high density fluids and particulate matter from the system. As indicated generally in FIG. 11, an appropriate electro-mechanical valve 85 may be mounted in the drain opening in place of the valve 17 in the embodiments of this invention shown in FIGS. 1 and 5. However, as shown in FIGS. 9 and 10, it will be necessary to pump the high density liquids and particulate matter out of the system if it is desired to remove them while the system is in operation. This is due to the fact that a pump means is usually connected to the outlet means 19 and 77 to deliver the fluid to the utilization device, thus creating a low pressure within the fluid separation device. As also indicated in FIGS. 9 and 10, the devices 70 and 70' may be provided with sensor probes 86 and 87 which are insulatingly sealed through the wall of the tank 72 and into the fluid contained in the lower portion thereof. An appropriate electrical device may be connected to the probes 86 and 87 to establish a potential difference therebetween which will produce a current flow through the fluid in contact with such probes. It will be understood that the current flow through the low density fluid will tend to be different than the current flow through a high density fluid and that the electrical control device may be designed to sense such difference. Thus, referring to FIG. 9, the electrical control device 90 may be designed to cause an indicator light 91 to be energized when the current flow between the probes 86 and 87 indicates that enough high density fluid has accumulated in the bottom of the tank 72 to contact such probes. An electrical switch may be provided on the control device 90 which may be manually operated to turn on the pump 93 thereby pumping the fluid from the bottom of the tank 72 through a check valve 94 and into a sump, not shown. However, referring to FIG. 10, it would also be possible to utilize an automatic electrical control device 90' which would automatically activate the pump 93 when the current flow between the probes 86 and 87 indicates the presence of sufficient high density fluid. In the embodiment of the invention shown in FIG. 10 the probe 86 would be located vertically above the probe 87 instead of both of the probes being located in a single horizontal plane as shown in FIG. 9.

Referring to FIG. 11, it will be understood that appropriate probe means could be provided in a modified cup means 11' in the devices 10 of the embodiments of this invention shown in FIGS. 1 through 6. Such probe means may conveniently take the form of inner 88 and outer 89 coaxial conductors insulated from each other and sealed through the wall of the cup means 11'. An appropriate electrical control device could of course be connected to the conductors 88 and 89 and to the electro-mechanical valve 85, as shown in either FIGS. 9 or 10 with or without a pump means corresponding to the pump 93.

From the above, it will be understood that a highly efficient apparatus for separating low density fluids from high density fluids and particles is provided by this invention. It is believed that such apparatus will find many applications and although the foregoing description has been written with respect to applications in which the low density fluid is the fluid sought for utilization, it will be understood that the apparatus could be used to remove low density fluid such as oil from a high density fluid such as water in applications where it is the high density fluid which is sought for utilization. In such applications it would of course be necessary to filter particulate matter from the high density fluid by a further filter means not shown in this application. However, even in such applications, apparatus according to the teaching of this invention would provide beneficial operation in the efficient removal of the low density fluids without requiring frequent replacement of the low density fluid filter.

It is believed that those skilled in the art will find many applications for the apparatus of this invention and that they may make obvious modifications in the specific structure and devices shown and described herein without departing from the teaching of this invention.

What is claimed is:

1. Apparatus for separating low density fluid from high density fluid and particles comprising:
   a. a fluid impervious hollow elongated chamber closed at one end by cup means;
   b. a fluid inlet passage extending into said chamber intermediate the ends thereof and having a tubular portion with a free end extending toward said cup means along the axis of elongation of said chamber;
   c. a fluid impervious funnel member surrounding said tubular portion of said inlet passage in close spaced relation to the outer surface thereof, the apex of said funnel member extending toward said cup member and the outer periphery of said funnel member forming a fluid-tight annular joint with the inner wall of said chamber;
   d. a deflector turbine means mounted at the free end of said tubular portion of said inlet passage to receive fluid from said inlet passage and urge said fluid to move in generally annular paths about the axis of elongation of said chamber, said deflector turbine means including a frusto-conical fluid impervious surface spaced from the free end of said tubular portion of said inlet passage having helical flutes therein and extending across said chamber with the apex thereof adjacent said free end of said tubular portion of said inlet passage and the periphery of the base thereof in close spaced relation to the inner surface of said chamber, said periphery of the base of said frusto-conical fluid impervious surface having a plurality of protuberances spaced from each other thereabout with each of said protuberances being located between a different pair of flutes on said frusto-conical surface and extending into contact with the inner surface of said chamber, and a frusto-conical member having an aperture at its apex communicating with said free end of said tubular portion of said inlet passage and having an inner frusto-conical surface mating with said fluted frusto-conical fluid impervious surface in close spaced relation thereto and an outer frusto-conical surface substantially parallel to said inner frusto-conical surface;
   e. an outlet passage extending out of said chamber intermediate its ends and having a tubular portion extending away from said cup means along the axis of elongation of said chamber;
   f. a tubular filter element more pervious to said low density fluid than said high density fluid surrounding said tubular portion of said outlet passage in spaced relation thereto, the outer surface of said tubular filter element being spaced from the inner surface of said chamber;
   g. fluid impervious wall means extending outwardly from the outer surface of said tubular portion of said outlet passage and across the inner end of said tubular filter element, said wall means forming fluid-tight joints with said outer surface of said tubular portion of said outlet passage and with the inner end of said tubular filter element and having its outer periphery in close spaced relation to the inner surface of said chamber; and
   h. fluid impervious cap means closing the other end of said chamber.

2. Apparatus as claimed in claim 1 wherein said inlet means is provided with a restriction spaced from said free end of said tubular portion thereof by a distance greater than the diameter of said tubular portion and a hollow ball of lightweight material having a diameter less than the diameter of said tubular portion is contained in said tubular portion and greater than the diameter of said restriction between said restriction and said deflector turbine means at said free end of said tubular portion.

3. Apparatus as claimed in claim 1 wherein said tubular portion of said outlet passage extends the length of said filter element and at least two aligned outlet holes are provided through the wall of said tubular portion at the end thereof adjacent said cap means, said holes having a total area greater than the cross-sectional area of said outlet passage.

4. Apparatus as claimed in claim 1 wherein said filter element comprises inner and outer foraminous walls with the volume therebetween filled with radial flow surface type filter material or resin impregnated cellulose.

5. Apparatus as claimed in claim 1 wherein said hollow elongated chamber comprises a hollow cylinder and an annular body between said hollow cylinder and said cup means, said annular body including a pair of integrally formed radially extending tubular members providing a pair of oppositely disposed passageways through the wall of said annular body, said tubular members being mechanically joined at the center of said annular body, one of said pair of tubular members providing said inlet passage, and the other of said pair of tubular members providing said outlet passage.

* * * * *

REEXAMINATION CERTIFICATE (1182nd)

United States Patent [19]
Richards et al.

[11] B1 3,931,011
[45] Certificate Issued  Jan. 9, 1990

[54] FLUID SEPARATION APPARATUS

[75] Inventors: Mark S. Richards; Shannon B. Copeland, both of Modesto, Calif.

[73] Assignee: Parker-Hannifin Corporation

Reexamination Request:
No. 90/001,632, Nov. 4, 1988

Reexamination Certificate for:
Patent No.: 3,931,011
Issued: Jan. 6, 1976
Appl. No.: 417,225
Filed: Nov. 19, 1973

[51] Int. Cl.⁴ .............................................. B01D 27/08
[52] U.S. Cl. ................................. 210/136; 210/304; 210/305; 210/311; 210/313; 210/335; 210/341; 210/456
[58] Field of Search ................. 210/86, 95, 114, 119, 210/136, 295, 304, 305, 311, 313, 335, 436, 341, 438, 456, 472, 512.1

[56] References Cited
U.S. PATENT DOCUMENTS

| | | | |
|---|---|---|---|
| 2,983,384 | 5/1961 | Winslow | 210/132 |
| 3,397,793 | 8/1968 | MacDonnell | 210/457 |
| 3,428,180 | 2/1969 | Rogers | 210/311 |
| 3,494,863 | 2/1970 | Greenman | 210/680 |

OTHER PUBLICATIONS

Racor Industries, Inc., "Warranty and Installation Handbook", Aug. 1, 1972.
Racor Industries, Inc., "Filtral-The Complete Filtration System" (no printed date).

Primary Examiner—W. Gary Jones

[57] ABSTRACT

An improved self-contained apparatus for the separation of low density fluids from higher density insoluble fluids or particles or both in which initial separation, coalescing and filtration steps are carried out substantially in series and in that order, is disclosed. Specific embodiments of such apparatus for use in oil-water separation are described and specific structures and devices for use in such apparatus are disclosed.

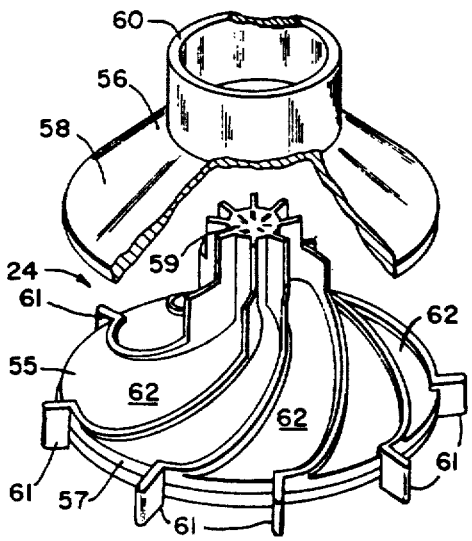

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 is confirmed.

* * * * *